(12) United States Patent
Fierle et al.

(10) Patent No.: US 6,260,606 B1
(45) Date of Patent: Jul. 17, 2001

(54) ROTOR CONSTRUCTION FOR AIR PREHEATER

(75) Inventors: Kurt M. Fierle, Wellsville, NY (US); Mark A. Perry, Fairmont, WV (US); Robin B. Rhodes, Wellsville, NY (US)

(73) Assignee: ABB Air Preheater, Inc., Wellsville, NY (US)

( * ) Notice: Subject to any disclaimer, the term of this patent is extended or adjusted under 35 U.S.C. 154(b) by 0 days.

(21) Appl. No.: 09/464,553

(22) Filed: Dec. 16, 1999

(51) Int. Cl.[7] .................................................. F23L 15/02
(52) U.S. Cl. .................................................. 165/8; 165/10
(58) Field of Search ................................ 165/10, 8, 6, 4, 165/9

(56) References Cited

U.S. PATENT DOCUMENTS

| 5,615,732 | * | 4/1997 | Brophy et al. | 165/10 X |
| 5,836,378 | * | 11/1998 | Brophy et al. | 165/8 X |
| 5,911,271 | * | 6/1999 | Fierle et al. | 165/8 X |

FOREIGN PATENT DOCUMENTS

| 829904 | * | 3/1960 | (GB) | 165/8 |
| 1539466 | * | 1/1990 | (SU) | 165/8 |
| 1672126 | * | 8/1991 | (SU) | 165/8 |

* cited by examiner

*Primary Examiner*—Christopher Atkinson
(74) *Attorney, Agent, or Firm*—Alix, Yale & Ristas, LLP (57) ABSTRACT

The rotor of an existing rotary regenerative air preheater is retrofitted with deeper cold end baskets for general performance enhancement and/or for the tolerance of ammonium bisulfate deposits. the normal cold end support gratings are removed and the support of the cold end baskets of increased depth is at least partially from the existing rotor stay plates.

1 Claim, 8 Drawing Sheets

ROTOR CONSTRUCTION FOR AIR PREHEATER

BACKGROUND OF THE INVENTION

The present invention relates to rotary regenerative heat exchangers used as air preheaters and more specifically to the modification of the rotor construction to accommodate cold end heat exchange baskets with deep cold end heat exchange elements for performance upgrades and most specifically to tolerate ammonium bisulfate deposits in plants being retrofitted with ammonia-based systems for the selective reduction of nitrogen oxide emissions.

A rotary regenerative air preheater is employed to transfer heat from the hot flue gas stream to the cold combustion air in a steam generator plant. The rotor of the air preheater contains a mass of heat absorbent material which first rotates through a passageway for the hot flue gas steam where heat is absorbed by the heat absorbent material. As the rotor continues to turn, the heated absorbent material enters the passageway for the cold combustion air where the heat is transferred from the absorbent material to the cold air.

In a typical rotary regenerative air preheater, the cylindrical rotor is disposed on a vertical central rotor post and divided into a plurality of sectors by a plurality of radial partitions, referred to as diaphragms, extending from the rotor post to the outer peripheral shell of the rotor. Each of these sectors is divided by a plurality of stay plates extending between adjacent diaphragms into a plurality of compartments which are loaded with modular heat exchange baskets which contain the mass of heat absorbent material commonly formed of stacked plate-like heat exchange elements. It is common that the heat exchange elements can become fouled with deposits particularly in the cold end baskets where materials tend to condense and this deposit formation is exacerbated by the presence of ammonium bisulfate in the flue gas.

The reduction of nitrogen oxides ($NO_x$) emissions from stationary combustion sources has become an important issue in most industrialized nations. As a result, the technology associated with the control of $NO_x$ emissions from fossil-fuel-fired steam generators has matured and expanded significantly. The $NO_x$ reduction processes available include both in-furnace $NO_x$ control and post-combustion $NO_x$ control primarily by selective catalytic or non-catalytic reduction. For example, with dry selective catalytic reduction systems, $NO_x$ reductions of 89 to 90 percent are achievable.

The selective catalytic reduction system uses a catalyst and ammonia gas as a reductant to dissociate $NO_x$ to nitrogen gas and water vapor. The catalytic process reactions are as follows:

$$4NO_{(g)} + 4NH_{3(g)} + O_{2(g)} \xrightarrow{catalyst} 4N_{2(g)} + 6H_2O_{(g)}$$

$$2NO_{2(g)} + 4NH_{3(g)} + O_{2(g)} \xrightarrow{catalyst} 3N_{2(g)} + 6H_2O_{(g)}$$

Since $NO_x$ is approximately 95-percent NO in the flue-gas of steam generators, the first equation dominates.

The selective catalytic reduction reaction chamber is typically located between the economizer outlet and air preheater flue-gas inlet. This location is typical for steam-generating units with selective catalytic reduction operating temperatures of 575 to 750° F. (300 to 400° C.). Upstream of the selective catalytic reduction reaction chamber are ammonia injection pipes, nozzles, and a mixing grid. A diluted mixture of ammonia gas in air is dispersed into the flue-gas stream and distributed in the gas stream by the mixing grid. The ammonia/flue-gas mixture then enters the reaction chamber where the catalytic reaction is completed.

The selective non-catalytic reduction method predominantly utilizes ammonia gas or aqueous urea, $CO(NH_2)_2$ as the reagent. The process is highly dependent upon flue-gas temperature and residence time for achieving high $NO_x$ removal efficiency. An effective temperature window ranging from 1600–2000° F. (870–1090° C.) is required for these systems. The primary chemical reaction for the two processes are as follows:

$$4NO+4NH_3+O_2 \rightarrow 4N_2+6H_2O$$

$$CO(NH_2)_2+2NO+\tfrac{1}{2}O_2 \rightarrow 2N_2+CO_2+2H_2O$$

With either the catalytic or non-catalytic selective reduction processes, if $SO_3$ is present in the flue gas either from the combustion process or from the catalytic oxidation of $SO_2$ to $SO_3$ and if there is unreacted ammonia from the selective reduction system, ammonium bisulfate forms by the following reaction:

$$NH_3+SO_3+H_2O \rightarrow NH_4HSO_4$$

This reaction takes place in a temperature range generally between 400 and 550° F. and is dependent upon a number of parameters, including the concentrations of the constituents and temperature. The ammonium bisulfate will collect or condense on flyash particles and surfaces it comes in contact with including the heat transfer surfaces within the air preheater. Operating experience on high dust units indicates that the deposits collect within the air preheater on metal surfaces with temperatures generally between 300 and 375° F. The deposit is in the form of a molten salt. In combination with flyash, the deposit is usually very sticky and difficult to remove. Experience has shown that for all regenerative air preheater designs and all ammonia slip levels, even as low as 1 ppm, there will be a measurable impact on pressure drop.

The consequences of ammonium bisulfate deposits on air preheater operation include the increase of pressure differential across the air preheater, an increase in air to gas leakage within the air preheater, a reduction in the thermal performance of the air preheater and an increase in the corrosion rates of heating elements, cold end structures and down stream equipment.

A typical design of an air preheater rotor contains multiple layers of heat transfer element baskets including one or more layers of hot end baskets at the top, one or more layers of intermediate temperature baskets and a layer of cold end baskets at the bottom. The stay plates previously mentioned extend from the upper hot end to the bottom of the intermediate baskets and have support bars welded to the bottoms which support the hot end and intermediate baskets which are loaded through the top of the rotor. The cold end baskets are supported by cold end rotor gratings and are loaded and unloaded radially through the side of the rotor. In a typical rotor, the stay plates with the basket support bars are approximately one inch above the cold end baskets. The cold end baskets typically have heat exchange element depth (height) of about 12 inches.

When a utility installs selective reduction equipment, ammonium bisulfate can condense and deposit on the heat transfer element surface through a given temperature range. This range can be over 75° F. Given this temperature range, the ammonium bisulfate in a plant with a typical air preheater can be deposited not only in the cold end baskets but in multiple layers of heat transfer baskets including intermediate temperature baskets. This means that the replacement of cold end baskets may not be sufficient.

To reduce the problems associated with the deposition of ammonium bisulfate in multiple layers of baskets, the use of deep cold end baskets has proven useful. This allows the ammonium bisulfate to be captured primarily with a single layer of baskets and it moves the deposits closer to the cold end cleaning device, such as a sootblower, to thereby improve the effectiveness of the cleaning device in removing the deposits. If the ammonium bisulfate were allowed to collect in a region which bridges across two layers of baskets, the rate of accumulation and the subsequent consequences are dramatically accelerated. The use of deep cold end baskets has also been useful for general performance upgrades aside from the ammonium bisulfate deposit problem.

To allow the installation of a single cold end layer of baskets with a significantly increased element depth of as much as 42 inches or more compared to the typical depth of about 12 inches, the existing rotors must be modified. In the past, this has been done by first removing the cold end grating, removing the existing support bars on the bottom of the stay plates and the corresponding supports on the rotor shell and central post area. Stay plate extensions with bottom support bars are then added to the bottom of the existing stay plates to allow the cold end baskets to be deeper and move them closer to the cold end sootblower. New inner and outer supports are also added at the bottom. Although the cost of the added parts to make these modifications is not great, the labor for installation and the outage time for the plant can be very significant.

SUMMARY OF THE INVENTION

The object of the invention is to provide economical and time saving designs for modifying and retrofitting the rotor and heat exchange baskets of an existing rotary regenerative air preheater for enhanced performance and to make them more tolerant of ammonium bisulfate deposits for steam generating plants which are adding selective reduction equipment of the catalytic or non-catalytic type for $NO_x$ reduction. The designs specifically provide for the support of cold end heat exchange baskets with increased depth to limit the deposition of ammonium bisulfate primarily to a single layer of cold end baskets. More particularly, the designs involve the removal of the cold end support gratings and the support of the cold end heat exchange baskets at least partially from the existing stay plates.

DESCRIPTION OF THE PREFERRED EMBODIMENTS

Figure 1:
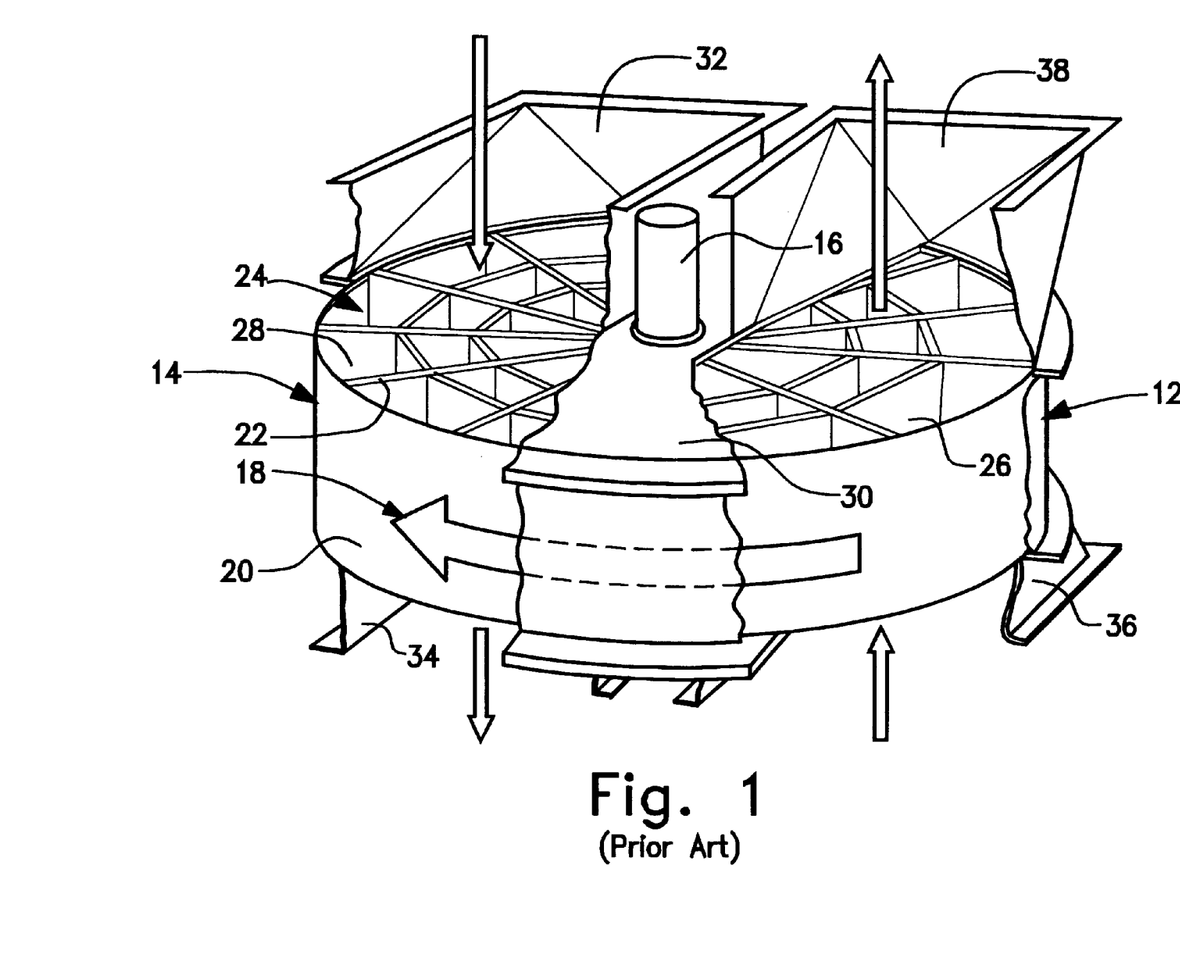
FIG. 1 is a generalized perspective view of a typical rotary regenerative air preheater showing the rotor sectors and compartments.

FIG. 1 of the drawing illustrates a partially cut-away perspective view of an air preheater showing a housing 12 in which a rotor 14 is mounted on drive shaft or post 16 for rotation as indicated by the arrow 18. The rotor has an outer shell 20 and a plurality of radially extending diaphragms 22 dividing the rotor into the pie-shaped sectors 24. The tangential plates 26, referred to as stay plates, divide each sector 24 into the generally trapezoidally-shaped compartments 28. The outermost compartments usually have a curved outer end defined by the rotor shell 20. Although not shown in this FIG. 1, each compartment contains a plurality of stacked heat exchange baskets. The housing of the air preheater is divided by the plate 30 into a flue gas side and an air side. A corresponding center section is located on the bottom of the unit. The hot flue gases enter the air preheater through the inlet duct 32, flow axially through the rotor where heat is transferred to the heat transfer surface in the baskets and then exit through the gas outlet duct 34. The countercurrent flowing air enters through the air inlet duct 36, flows through the rotor 14 and picks up heat and then exits through the air outlet duct 38.

Figure 2:
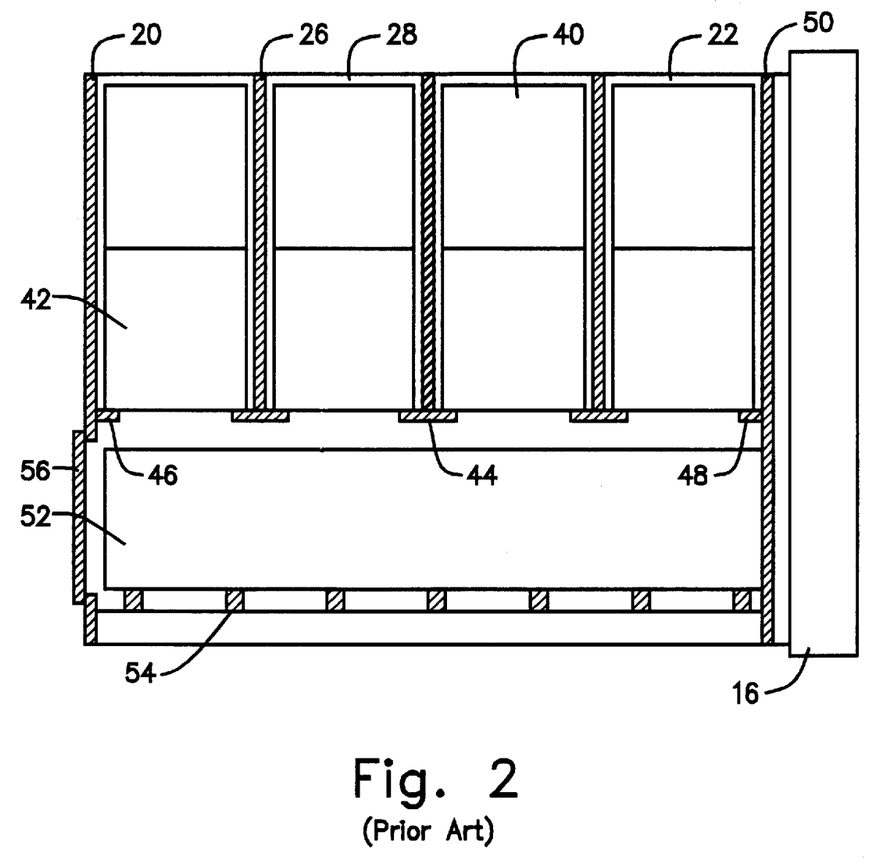
FIG. 2 is a vertical cross section through a portion of the rotor of a conventional prior art design.

FIG. 2 is an elevation cross section of a portion of the rotor of FIG. 1 basically showing one sector with the radial diaphragm 22 extending between the rotor post 16 and the rotor shell 20. The stay plates 26 together with the diaphragms 22 form the compartments 28. This FIG. 2 is a cross section of a conventional prior art rotor of the type to be modified by the present invention and includes a plurality of heat exchange baskets stacked in layers in each of the compartments 28. Two layers are illustrated comprising the high temperature baskets 40 and the intermediate temperature baskets 42, collectively referred to herein as the hot end baskets. The specific number of layers can be varied. These hot end baskets 40 and 42 are loaded into the rotor from the top and are supported on the support bars 44 welded across the bottoms of the stay plates 26 and the supports 46 and 48 on the rotor shell 20 and the inner end 50 of the sector. The cold end baskets 52 are supported on the cold end grid or grating 54 attached to and extending between adjacent diaphragms and these baskets are loaded into the rotor radially through the door 56 in the rotor shell 20.

Figure 3:
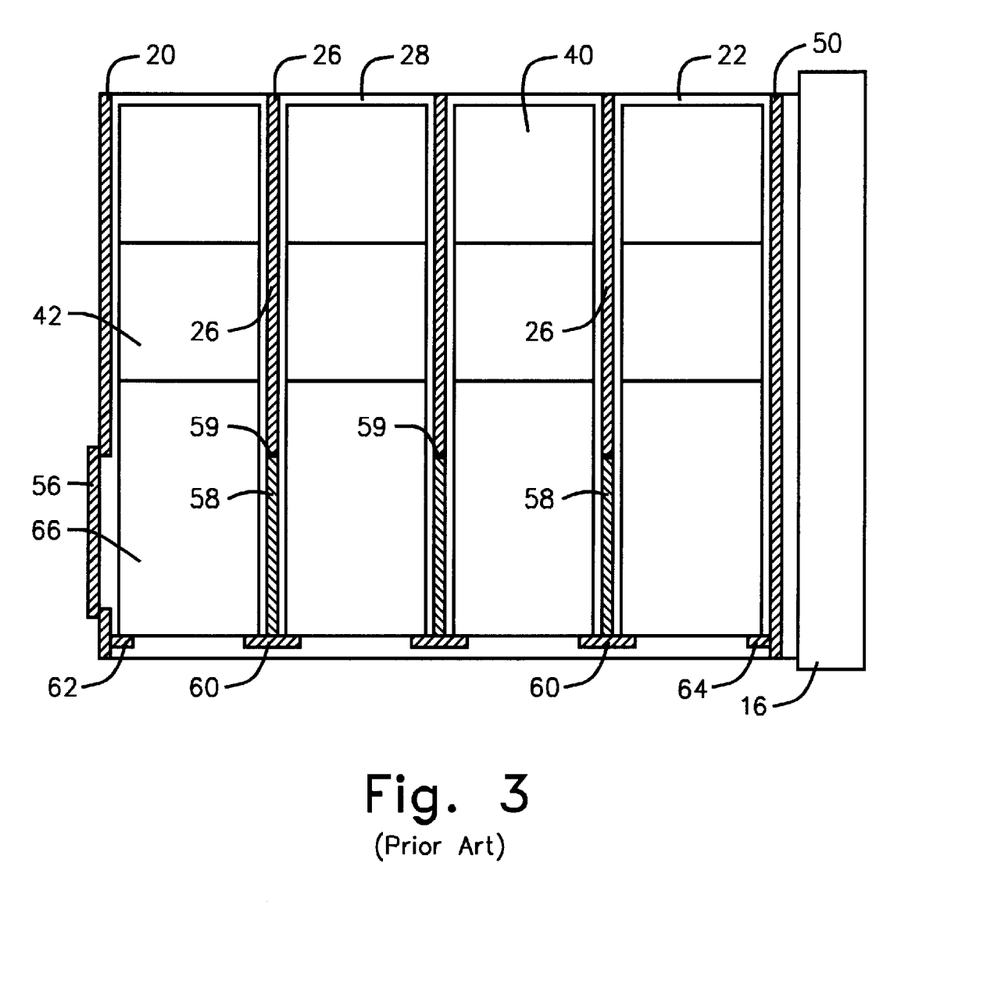
FIG. 3 is a similar vertical cross section of a rotor modified according to the prior art to be ammonium bisulfate tolerant.

FIG. 3 illustrates the modifications to the rotor and basket arrangement of FIG. 2 which have been made in the past to make the arrangement more tolerant of ammonium bisulfate deposits. In this FIG. 3 prior art embodiment, the cold end grating 54 and the supports 44, 46 and 48 have been removed. Stay plate extensions 58 have been welded at 59 to the stay plates 26 with the support bars 60 attached to the bottoms. Corresponding supports 62 and 64 are now attached to the rotor shell 20 and the inner end 50 respectively. The cold end baskets, now designated 66, have a significantly larger depth (height) and, in this particular illustrated example, the hot end baskets 40 and 42 have been reduced in depth. The cold end baskets 66 are now loaded from the top. Although this prior art arrangement serves the purpose of limiting the ammonium bisulfate deposits primarily to the cold end baskets, considerable field labor and outage time are involved in modifying the rotor and baskets in this manner.

Figure 4:
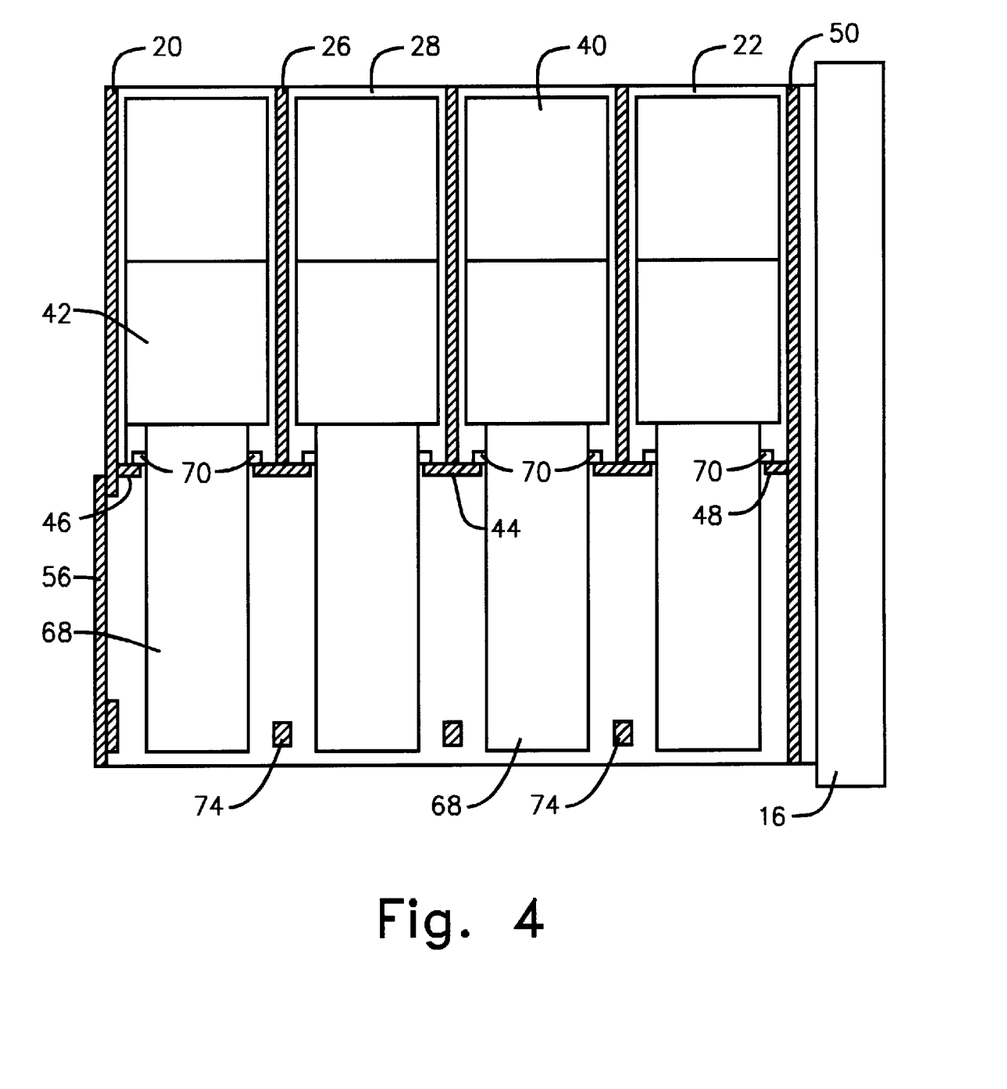
FIG. 4 is a vertical cross section through a rotor modified in accordance with the present invention to be ammonium bisulfate tolerant.

FIG. 4 shows a first embodiment of the present invention which comprises a modification of the rotor structure and baskets of the prior art of FIG. 2 for the purposes of the present invention. In this embodiment, the cold end support grid 54 has been removed but the stay plates 26, the support bars 44 and the outer and inner supports 46 and 48 remain unchanged. The new deep cold end baskets 68 are now supported from the stay plate support bars 44 and the inner and outer supports 46 and 48 by the basket support blocks or bars 70 welded along the inner and outer side faces of the baskets 68. These blocks or bars 70 may be single bars extending all the way across or they may be individual blocks with one block on each corner of a basket.

In this particular FIG. 4 embodiment of the invention, the hot end and intermediate temperature baskets are supported on top of the cold end baskets. This is shown in more detail in FIG. 5 which is a cross section through a portion of the rotor and through a cold end basket 68 and an intermediate temperature basket 42. This shows ledges 72 on the top inside and outside edges of the cold end basket 68 on which the inside and outside bottom edges of the intermediate temperature baskets 42 are supported.

Since the support grids 54 have been removed and since these support grids provided bracing between the bottom ends of the diaphragms, braces 74 extending between adjacent diaphragms are added as may be necessary to provide any required bracing. It can readily be seen that the changes required in the rotor structure to go from the FIG. 2 prior art rotor to the FIG. 4 embodiment of the present invention are significantly fewer and easier than going from the FIG. 2 to the prior art FIG. 3 modified rotor.

Figure 5:
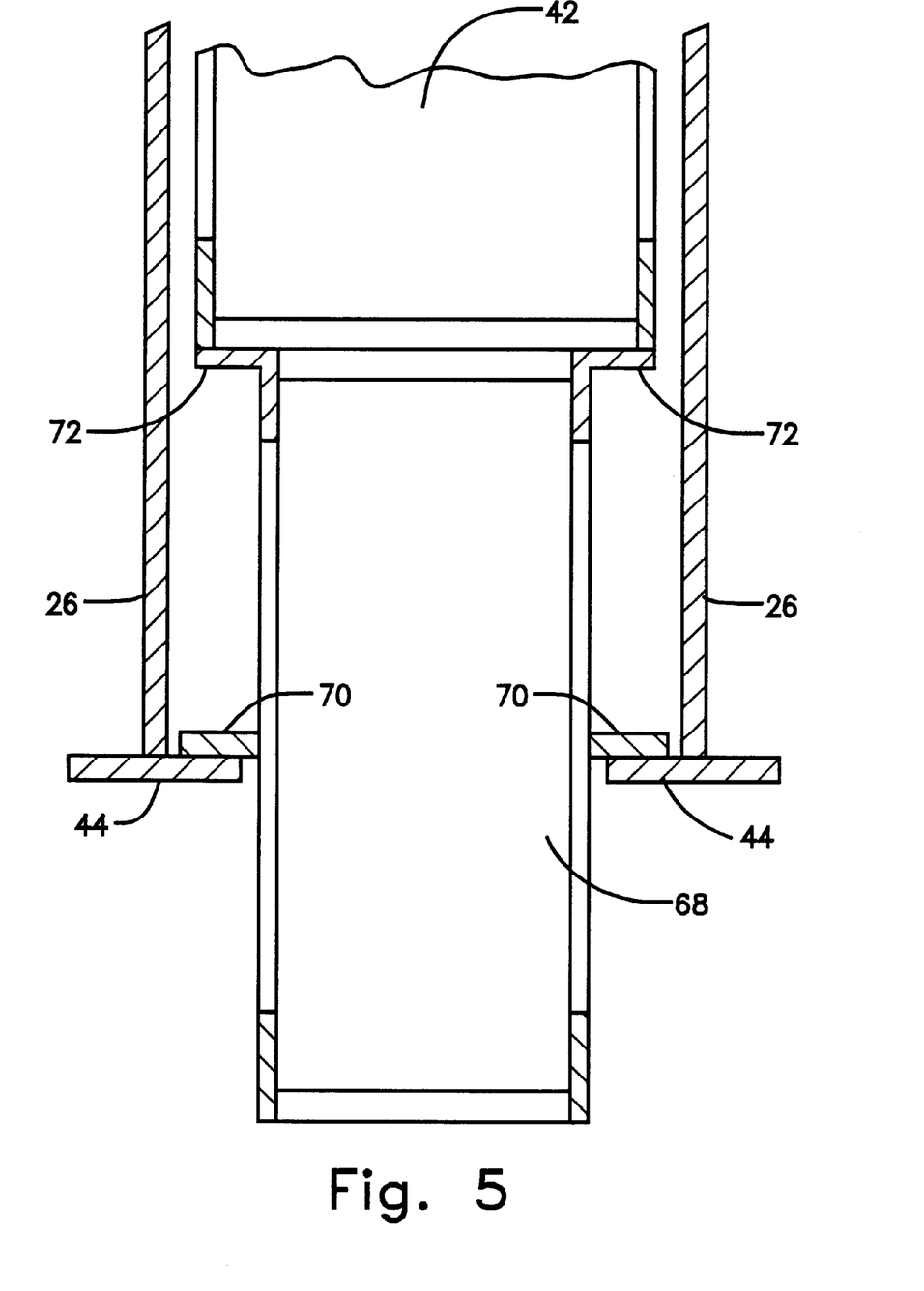
FIG. 5 is a vertical cross section of one of the compartments of FIG. 4 showing the details of the stacking of the heat exchange baskets.
Figure 6:
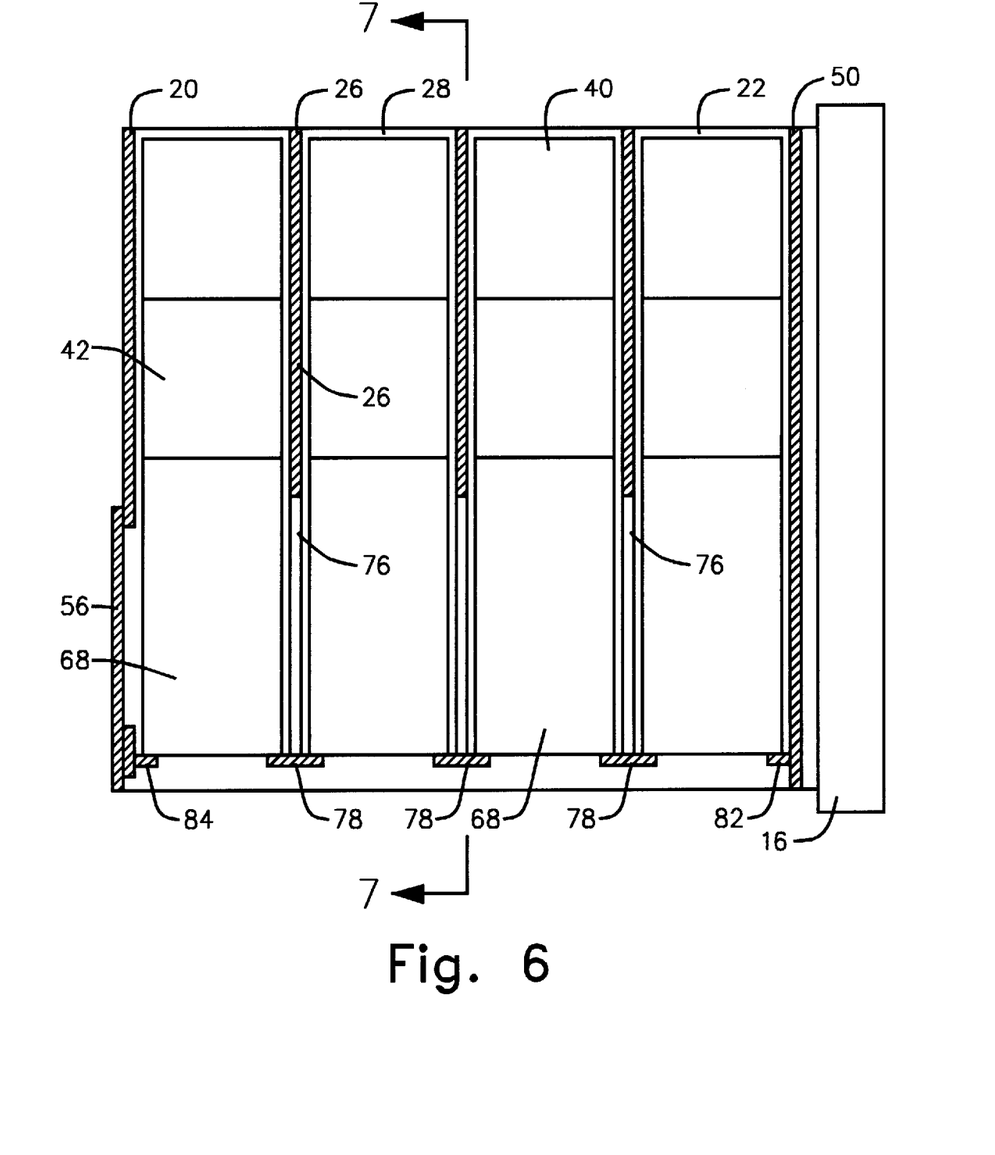
FIG. 6 is a vertical cross section similar to FIG. 4 illustrating an alternate embodiment of the invention.
Figure 7:
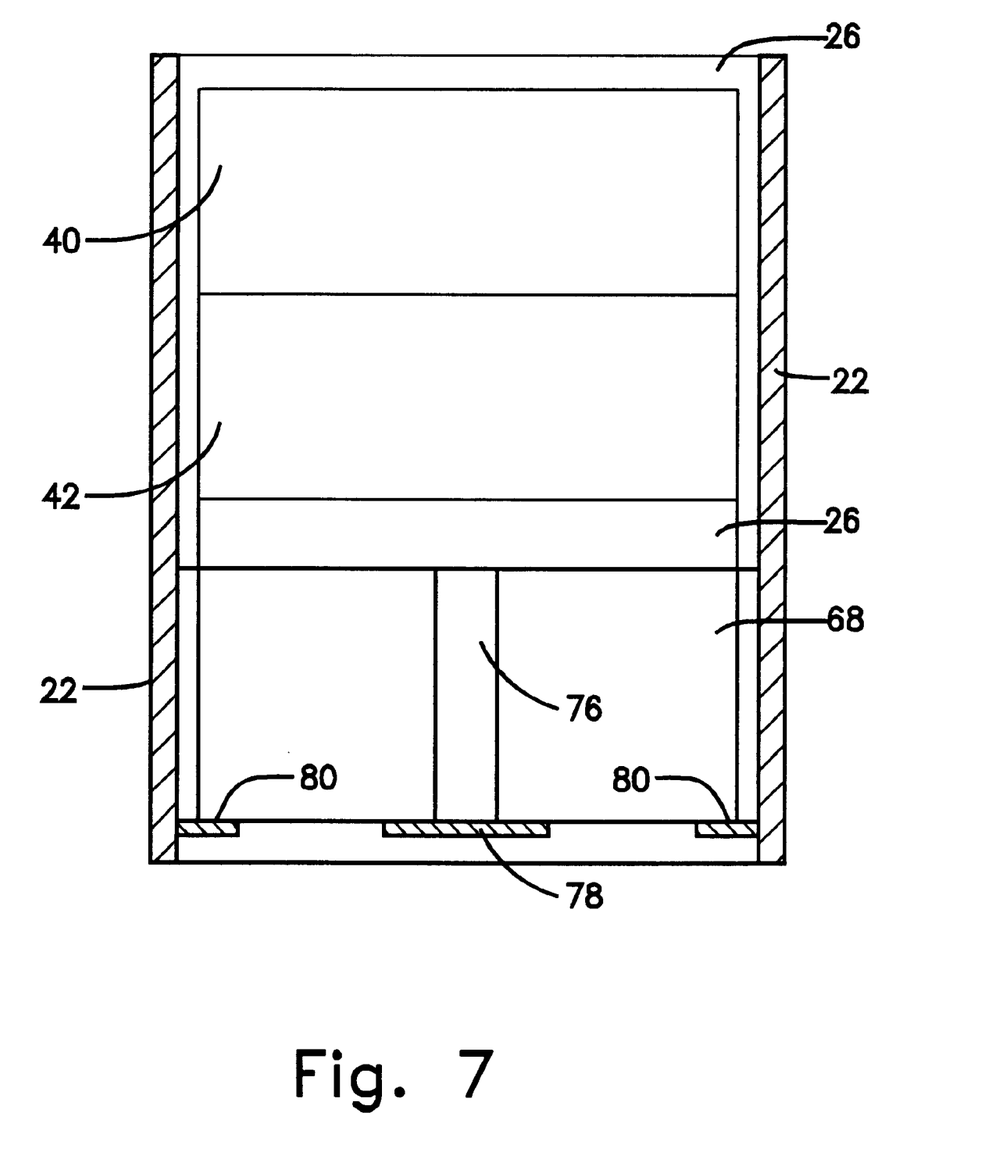
FIG. 7 is also a vertical cross section but taken along a tangential line 7—7 of the FIG. 6 embodiment.

A second embodiment of the invention is illustrated in FIGS. 6 and 7 in which FIG. 6 is a vertical, radial cross section view similar to FIG. 4 and FIG. 7 is a vertical, tangential cross section view taken along line 7—7 of FIG. 6. This embodiment provides an alternate way of suspending the deep cold end baskets 68 from the existing stay plates 26. Instead of suspending the deep cold end baskets 68 from the support bars 44 on the stay plates by means of the blocks or bars 70 on the sides of the cold end baskets as in FIGS. 4 and 5, hanger plates 76 are attached as by welding to the bottoms of the stay plates 26 with these hanger plates 76 extending down to the bottoms of the cold end baskets 68. Attached to the bottoms of the hanger plates 76 are the support bars 78 on which the cold end baskets 68 are supported. Attaching these hanger plates 76 to the existing stay plates 26 is a much easier task than extending the entire stay plate as in the prior art of FIG. 3. As shown in FIG. 7, the hanger plates 76 and support bars 78 are centered with respect to the stay plates 26 and partially support the cold end baskets. To support the sides of the cold end baskets, support blocks 80 are located at the corners of the baskets and welded to the diaphragms 22. These blocks 80 can be seen in FIG. 7 but are hidden from view in FIG. 6. The inboard end of the inner cold end basket is supported by the inner support bracket 82 while the outboard end of the outer cold end basket is supported at the center by the outer support bracket 84 as well as the support blocks 80 on the diaphragms.

Figure 8:
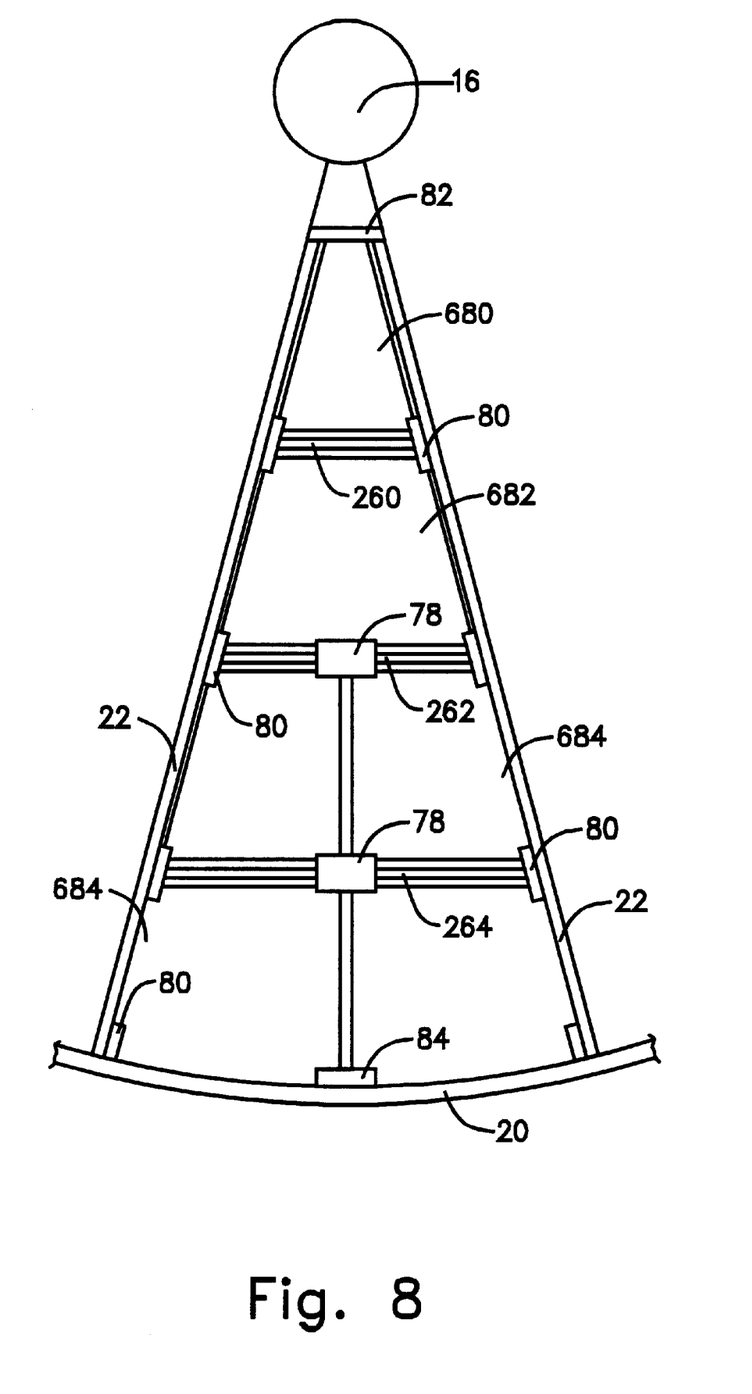
FIG. 8 is a bottom view of one rotor sector showing an alternate arrangement of heat exchange baskets.

Although the rotor illustrated in the embodiment of FIGS. 4 and 5 and the embodiment of FIGS. 6 and 7 contains only one heat exchange basket in each layer of each compartment, it is common for larger air preheaters to have two baskets side-by-side on each level or layer at least in the outer compartments due to the large size of these outer compartments and the need or desire to maintain weight limitations on individual baskets. This is illustrated in FIG. 8 which is a bottom view of one sector of a rotor wherein dual baskets are side-by-side in the outer two compartments. This particular illustration relates to the embodiment of the invention shown in FIGS. 6 and 7 but the same dual basket arrangement would apply to the embodiment of FIGS. 4 and 5. In this FIG. 8, the inner stay plate 260 does not have a hanger plate 76 or a support bar 78. The inner cold end basket 680 is supported only by the support blocks 80 and the inner support bracket 82. Also, the inner end of the cold end basket 682 is supported only by the support blocks 80. The stay plates 262 and 264 do have the hanger plates and support bars 78 with these support bars 78 supporting the inside corners of the dual baskets 684.

What is claimed is:

1. A rotor of a rotary regenerative air preheater which can collect deposits in the cold end comprising:
   a. a plurality of radially extending diaphragms dividing said rotor into a plurality of sectors;
   b. at least two layers of heat exchange baskets located in each sector with a plurality of baskets in each layer, the top ones of said layers comprising hot end baskets and the bottom one of said layers comprising cold end baskets said cold end baskets having top and bottom ends;
   c. a plurality of spaced tangentially extending stay plates in each of said sectors attached to and between adjacent ones of said diaphragms and located between radially adjacent ones of said hot end and cold end baskets and dividing each sector into a plurality of generally trapezoidally-shaped compartments, said stay plates having bottom end terminating below the tops and above the bottoms of said cold end baskets;
   d. cold end basket support bars attached to the bottom ends of said stay plates said support bars extending along the bottom ends of said stay plates perpendicular thereto; and
   e. support means attached to said cold end baskets and located between said tops and said bottoms of said cold end baskets, said support means being supported on said support bars whereby said cold end baskets are hung from said support bars.

* * * * *